Apr. 10, 1923.

A. J. BEINGESSNER

WEED PULLER

Filed Mar. 22, 1922

1,451,455

Witnesses:

Albert John Beingessner

Inventor.

Patented Apr. 10, 1923.

1,451,455

UNITED STATES PATENT OFFICE.

ALBERT JOHN BEINGESSNER, OF CALGARY, ALBERTA, CANADA, ASSIGNOR OF ONE-THIRD TO ALBERT BEINGESSNER AND ONE-THIRD TO ALFRED E. ALLEN, BOTH OF CALGARY, ALBERTA, CANADA.

WEED PULLER.

Application filed March 22, 1922. Serial No. 545,797.

*To all whom it may concern:*

Be it known that I, ALBERT JOHN BEINGESSNER, a subject of the King of Great Britain and Ireland, and residing at Calgary, in the Province of Alberta, Canada (whose post-office address is c/o W. J. Gray, 1648 Third Ave. S. W., Calgary, Alberta, Canada), have invented certain new and useful Improvements in a Weed Puller, of which the following is a specification.

My invention relates to improvements in a weed puller, in which I employ a puller mounted upon a carriage in such a way that it may travel upon or within the ground as desired, and I have in combination with the puller, a cleaner which will prevent the weeds being trailed along the ground by the puller bar after being pulled.

I attain these objects by the device illustrated in the accompanying drawings, in which—

Similar characters refer to similar parts throughout the several views.

Figure 1:
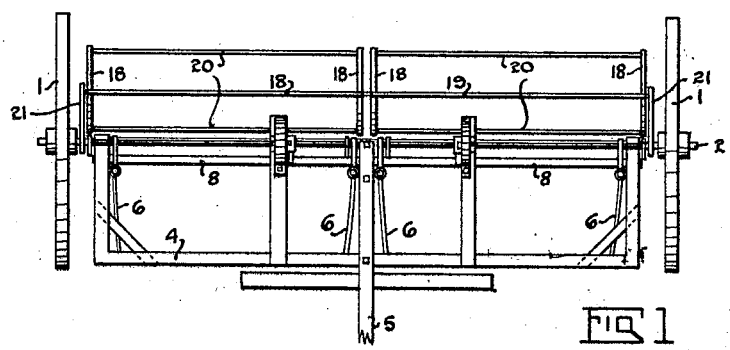
Fig. 1, is a plan view showing the carriage and the cleaner in relation to the puller bar.
Figure 2:
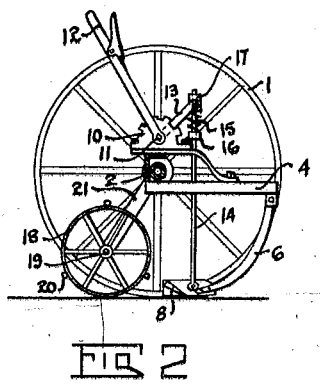
Fig. 2, is a vertical cross section through the machine.
Figure 3:
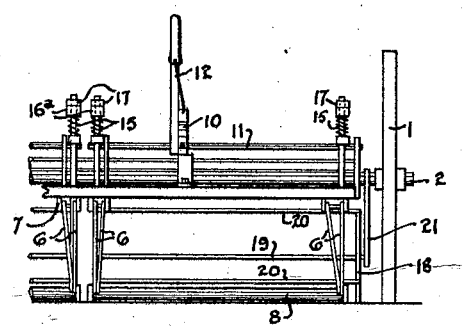
Fig. 3, is a partial elevation of the front of the machine, and shows the method of suspending the puller bar from the carriage member.
Figure 4:
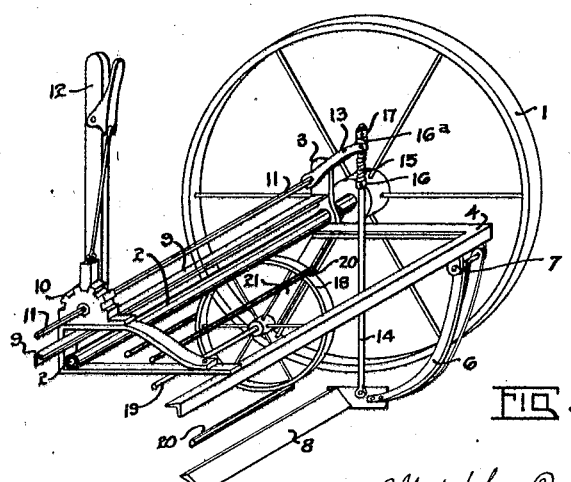
Fig. 4, is a perspective view of one end of the machine showing in detail the mechanism for raising and lowering the weed puller.

Travelling wheels 1, are mounted for rotation at each end of a central axle 2, and upon this axle at intermediate points brackets 3, are mounted to which brackets a U shaped frame 4, is secured. Centrally of the axle 2, between the travelling wheels 1, a draw bar 5, is secured, which is also secured to, and supports the U shaped frame 4. Motive power is applied through this bar 5, the said draw bar being raised from the ground to the height required. Curved hanger arms 6, are provided which are pivoted in brackets 7, securely mounted upon the front member of the frame 4. Into the lower ends of these curved hangers 6, a pulling bar 8, is secured. Joining the brackets 3, which brackets are mounted upon the axle 2, and extending across the width of the machine is an angle iron stiffening member 9, which also forms a support for a quadrant 10. This quadrant 10, is provided with a central bushing through which a long rectangular rod 11, passes. The rod 11, is supported in the brackets 3, at each end of the machine, a setting lever 12, being keyed upon the said rod in relation to the quadrant 10. Arms 13, are also keyed upon the said rod 11, which are pivoted to a collar 16 around the depth control rods 14. The depth control rods 14, are pivoted at their lower end to the hanging arms 6, and at their upper end are suspended through the collar 16$^a$ which engages a stop 17, for lifting purposes, a spring 15, coiled around the rods 14, and co-acting upon a collar 16 giving the automatic control of depth.

At the back of the puller bar 8, and approximately parallel thereto, is a cleaning device consisting of wheels 18, mounted for rotation upon a central shaft 19, the said wheels 18 being spaced upon the shaft 19, and having rods 20, rigidly mounted at intervals upon and adjoining their peripheries, thus forming an open sided roller. The shaft 19, is mounted in arms 21, which are suspended from the central axle 2, of the machine, so that the weight of the roller will maintain it in rolling contact with the ground and the rods 20, will hold the tops of the weeds upon the ground while the puller is uprooting them.

What I claim is:

1. In a weed puller, in combination with a carriage and a frame mounted thereon, a puller bar mounted in the lower end of hangers pivoted in brackets upon the said frame, depth control rods pivoted to the said hangers and adapted to raise or lower the position of the pulling bar, a setting lever and quadrant controlling the movement of the said depth control rods, and a rotary pressure member adapted to engage the tops of the weeds and press them upon the surface of the ground, all substantially as described.

2. In a weed puller, in combination with a carriage and a frame mounted thereon, a pulling bar mounted in the lower end of hangers pivoted upon the said frame, depth control rods pivoted to the said hangers and adapted to raise or lower the position of the pulling bar, a setting lever and quadrant controlling the movement of the said depth control rods, and a rotary pressure member adapted to engage the tops of the weeds and press them upon the surface of the ground, the said pressure member consisting of disc wheels mounted loosely upon a central shaft and separated from one another by a plurality of rods mounted upon and joining their peripheries across the space between the said discs, the central shaft upon which the disc wheels are mounted, being pivoted upon the carriage of the device and adapted to be always in rolling contact with the ground surface, all substantially as described.

ALBERT JOHN BEINGESSNER.

Witnesses:
W. J. Gray,
A. E. Allen.

Certificate of Correction.

It is hereby certified that the name of the first mentioned assignee in Letters Patent No. 1,451,455, granted April 10, 1923, upon the application of Albert John Beingessner, of Calgary, Alberta, Canada, for an improvement in "Weed Pullers," was erroneously written and printed as "Albert Beingessner," whereas said name should have been written and printed as *Otto Beingessner*, as shown by the records of assignments in this office; and that the said Letters Patent should be read with this correction therein that the same may conform to the record of the case in the Patent Office.

Signed and sealed this 5th day of June, A. D., 1923.

[SEAL.]

KARL FENNING,
*Acting Commissioner of Patents.*